May 15, 1962     A. Z. GREENBERG     3,035,133

SPEED WARNING DEVICE FOR VEHICLE

Filed March 27, 1959

INVENTOR.

Arthur Z. Greenberg

BY Roberts, Cushman + Grover

ATT'YS

United States Patent Office 3,035,133
Patented May 15, 1962

3,035,133
SPEED WARNING DEVICE FOR VEHICLE
Arthur Z. Greenberg, 493 Blue Hill Parkway, Milton, Mass.
Filed Mar. 27, 1959, Ser. No. 802,419
3 Claims. (Cl. 200—61.89)

This invention relates to signal devices and more especially to devices for use in automobile vehicles to warn the operator that he has reached and/or is exceeding a given speed.

Signal devices are available with certain makes of automobiles, however, these are generally supplied by the manufacturer as one of a group of safety devices at an unconscionably high cost to the purchaser and are generally built in the automobile in conjunction with the speedometer mechanism and/or some kind of governor control. Such devices are not generally available for purchase and installation by the automobile owner independently of the manufacturer.

The principal objects of this invention are to provide a warning device which can be purchased and easily installed in any vehicle by the owner, independently of the speedometer mechanism or governor control means; to provide a device which will give a signal when the vehicle has reached a predetermined speed, but will not interfere with further acceleration of the vehicle, if this is necessary; to provide a device which will give an audible and/or a visible signal; to provide a device which can be easily adjusted to produce a signal for different speeds; and to provide a device which can be manufactured so inexpensively that it will be available to all motorists.

As herein illustrated, the warning device is used in combination with an accelerator treadle and comprises a pair of normally spaced electrical contact elements, supported adjacent the treadle, so that one is yieldably movable in the direction of depression of the treadle and the other is movable with the treadle, as the latter is depressed, to bring it into engagement with the yieldable element, and means electrically connected to the contacts, operable by engagement of the same to produce a signal. The device includes a bracket which is adapted to be clamped to an end of the treadle, having a laterally disposed arm on which there is suspended a spindle, one end of which is adapted to bear against the floor below the treadle and along which the bracket arm is adapted to move relative to the spindle by depression of the treadle. An insulator slidably mounts one of the contacts on the spindle and there is yieldable means disposed behind the insulator mounted contact holding the latter at a predetermined distance from the arm. The other contact is constituted by the arm itself, and the latter is adapted to move into engagement with the insulator mounted contact by depression of the treadle.

The invention will now be described in greater detail with reference to the accompanying drawings wherein.

Figure 1:
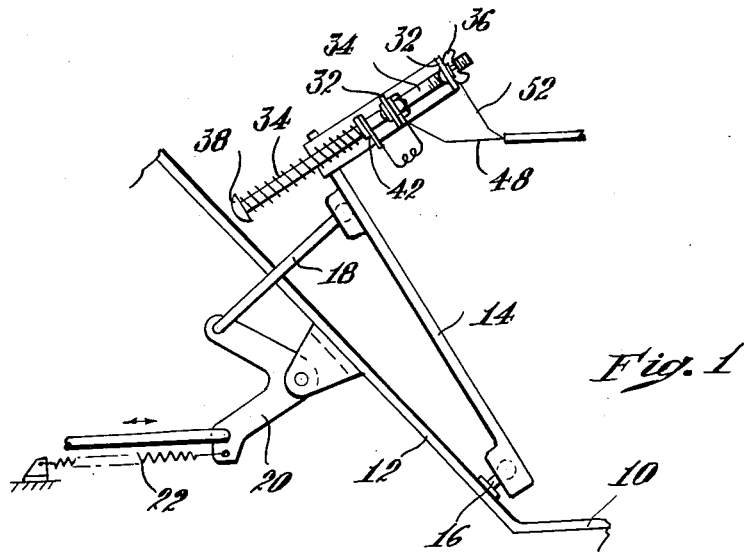
FIG. 1 is a side elevation of the device mounted on a vehicle accelerator treadle, the latter being shown pivoted at its lower end adjacent the floor of the vehicle and substantially parallel to the upwardly inclined foot rest.
Figure 2:
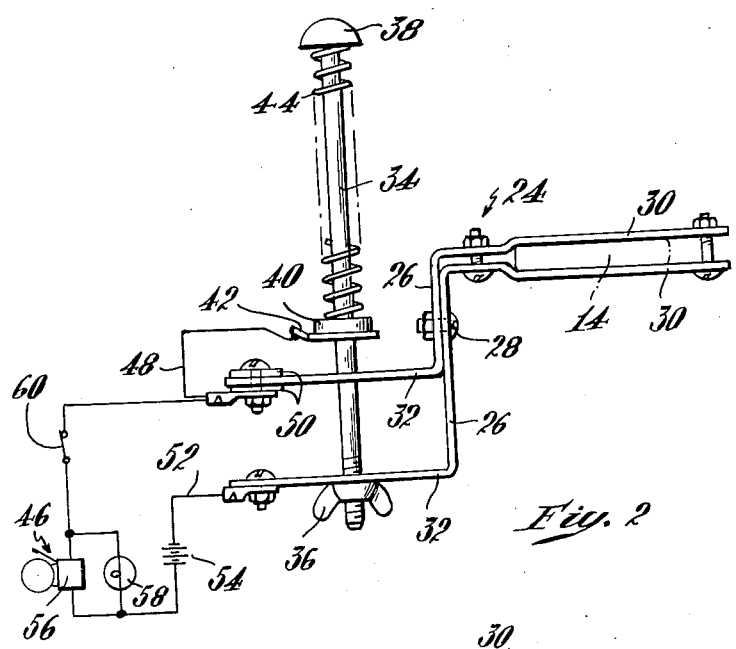
FIG. 2 is a transverse elevation of the device, taken perpendicular to the inclined foot board.
Figure 3:
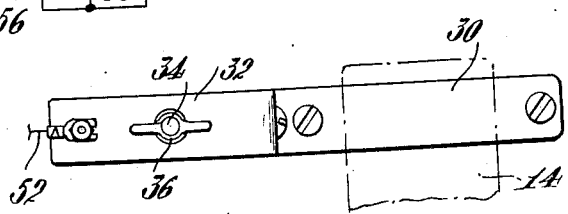
FIG. 3 is a plan view of the device, taken perpendicular to the treadle.

Referring to the drawings, there is shown in outline only, a portion 10 of the floor of the vehicle and the upwardly inclined foot board 12. An accelerator treadle 14 is pivotally mounted at its lower end, at the base of the foot board, on a pivot 16, so as to be substantially parallel with the foot board and is normally held in this position by means of a link 18, which extends downwardly through the foot board and is connected to a bell crank 20 which in turn is connected to the carburetor. A spring 22 holds the treadle elevated.

The warning device, which forms the subject matter of this invention, is mounted on the treadle 14 so as to be movable therewith as the latter is depressed, so as to actuate a warning device in the form of a visible and/or audible signal. The device comprises a bracket 24 made up of two rigid Z-shaped elements 26, bolted together with their shanks in engagement by means of a screw bolt 28, with the arms 30—30, at one end, extending laterally in spaced parallel relation, in one direction, and the arms 32—32, at the other end, extending laterally in the opposite direction in spaced parallel relation. The shank portions may be slotted for reception of the bolt 28 fastening them together so that the spacing of the arms 30—30 may be adjusted to receive between them the end of the accelerator treadle. The arms 30—30 contain registering holes through which screw bolts may be passed to fix the bracket to the treadle. Holes will, of course, have to be drilled through the treadle to permit passage of the screw bolts through the arms 30—30. The arms 32—32 contain registering openings in which there is suspended a spindle 34, the upper end being threaded and being supported on the upper arm 32 by a wing nut 36, which provides a convenient means for adjusting the length of the spindle, so that when mounted on the accelerator treadle its lower end 38 will rest upon the inclined foot board 12. A disc 40, of suitable insulation, is slidably mounted on the spindle 34, below the lower one of the arms 32, and this disc carries a contact element 42 which is electrically conductive. A coiled spring 44 is mounted on the spindle, below the insulator mounted conductor, so as yieldingly to hold the conductor at a predetermined spacing from the lower one of the arms 32. The length of the spring 44 will determine the speed which may be attained before the signal is produced and will, of course, permit the speed to be increased beyond that point while continuing to produce a signal but without interfering with acceleration of the vehicle. The openings in the arms 32—32 are large enough so that they are free to move relative to the spindle; consequently, as the accelerator treadle is depressed the arms move downwardly along the spindle. The lower one of the arms 32 constitutes the other contact of an electrical circuit containing the two contacts and signal means 46. As illustrated, a conductor 48 is connected at one end to the contact 42 and to a bolt fixed in the lower arm 32, but is insulated therefrom by washers 50. A second conductor 52 is connected to the upper of the arms 32. The conductors 48 and 52 may be connected to dry battery cells, or to the storage battery of the vehicle, diagrammatically illustrated at 52. When the circuit is established by engagement of the arm 32 and the contact 42, energy is supplied to the signalling means 46 so as to produce a signal in the form of an audible signal 56 or visual signal 58, for example, a sustained buzzing or a continuous or blinking light. When a visual signal is employed, preferably it is mounted on the dashboard in such a position as to immediately be seen.

It is, of course, within the scope of the invention to vary the construction of the device in whatever fashion is deemed to be most expedient for the purpose of simplicity of manufacture and low cost and accordingly the bracket may be made of one or more pieces and provided with various adjustments and clamping means so that it can be quickly and easily mounted in any vehicle by the owner without the assistance of a mechanic or the use of tools not ordinarily available. As previously stated, the spring 44 on the spindle 34 will be made of a length to suit the character of the vehicle on which the device is to be used and the speed at which the driver wants to operate and these may be quickly changed so that the driver can use them selectively for different speeds in different parts of the country. Preferably, a manually operable switch 60 is included in the circuitry which may be placed at a point convenient to the driving wheel so that if the operator wants to turn off the mechanism he may do so.

It should be understood that the present disclosure is for the purpose of illustration only and that this invention includes all modifications and equivalents which fall within the scope of the appended claims.

I claim:

1. For use with a warning device an electric switch comprising a bracket adapted to be mounted on an accelerator treadle for movement therewith, a contact integral with said bracket, a spindle slidably mounted through said bracket in such fashion as to engage the floor of a vehicle when said bracket is attached to the vehicle's accelerator treadle, a movable contact, and means yieldingly supporting said movable contact on the spindle at a predetermined distance from the other contact.

2. For use with an automatic speed warning device, an electric switch comprising a bracket adapted to be mounted on an accelerator treadle for movement therewith, a contact integral with said bracket, a spindle slidably mounted through said bracket so as to engage the floor of a vehicle when the bracket is attached to the vehicle's accelerator treadle, an insulating ring slidable on said spindle, a movable contact mounted on said insulating ring, and a helical spring yieldingly supporting the moving contact on the spindle at a predetermined distance from the other contact.

3. For use with a speed warning device, an electric switch comprising a bracket adapted to be mounted on an accelerator treadle for movement therewith, a contact fixedly attached to said bracket, a spindle slidably mounted through said bracket substantially transverse the plane of the treadle with an end adjacent the floor of the vehicle beneath the treadle and movable relative the treadle by depression of the treadle, a movable contact slidably mounted on the spindle, and a spring yieldingly supporting said movable contact on the spindle at a predetermined distance from its end, said fixed contact being movable into engagement with the movable contact by depression of the treadle a predetermined distance, and said fixed and movable contacts being themselves movable while in contact without interfering with further depression of the treadle.

References Cited in the file of this patent

UNITED STATES PATENTS

| | | |
|---|---|---|
| 1,262,716 | Thomas | Apr. 16, 1918 |
| 1,674,592 | Drohen | June 19, 1928 |
| 2,111,284 | Girl et al. | Mar. 15, 1938 |
| 2,332,699 | Culpepper | Oct. 26, 1943 |
| 2,800,545 | Pellegrino | July 23, 1957 |
| 2,830,284 | Keegin | Apr. 8, 1958 |